(12) United States Patent
Ramsing (10) Patent No.: US 11,870,192 B2
(45) Date of Patent: Jan. 9, 2024

(54) CHARGING ADAPTER FOR CHARGING A BATTERY FOR BLINDS AND ELECTRIC CURTAINS ALL HAVING A DC BATTERY

(71) Applicant: SOMFY ACTIVITES SA, Cluses (FR)

(72) Inventor: Peter Ramsing, Odense SØ (DK)

(73) Assignee: SOMFY ACTIVITES SA, Cluses (FR)

( * ) Notice: Subject to any disclaimer, the term of this patent is extended or adjusted under 35 U.S.C. 154(b) by 0 days.

(21) Appl. No.: 17/918,738

(22) PCT Filed: Mar. 25, 2021

(86) PCT No.: PCT/DK2021/050089
§ 371 (c)(1),
(2) Date: Oct. 13, 2022

(87) PCT Pub. No.: WO2021/209100
PCT Pub. Date: Oct. 21, 2021

(65) Prior Publication Data
US 2023/0121612 A1   Apr. 20, 2023

(30) Foreign Application Priority Data

Apr. 14, 2020   (DK) .......................... PA 2020 00438

(51) Int. Cl.
*H01R 31/06*   (2006.01)
*H02J 7/00*   (2006.01)
(Continued)

(52) U.S. Cl.
CPC ......... *H01R 31/06* (2013.01); *H01R 13/6205* (2013.01); *H02J 7/0045* (2013.01); *E06B 9/262* (2013.01); *H02J 2207/20* (2020.01)

(58) Field of Classification Search
CPC .... H02J 7/0045; H02J 2207/20; H01R 31/06; H01R 13/6205; E06B 9/262
(Continued)

(56) References Cited

U.S. PATENT DOCUMENTS 6,794,778 B1   9/2004   Walker et al.
2007/0259536 A1   11/2007   Long
(Continued)

FOREIGN PATENT DOCUMENTS

CH   684427   9/1994
CN   104271866   1/2015
(Continued)

OTHER PUBLICATIONS

Written Opinion of International Search Report in PCT/DK2021/050089 dated May 28, 2021.
(Continued)

*Primary Examiner* — Edward Tso
*Assistant Examiner* — Aaron Piggush
(74) *Attorney, Agent, or Firm* — Wissing Miller LLP (57) ABSTRACT

This invention relates to a charging adapter 30, 40 for charging a battery 20, 50 of a solar blind, a roller blind, a roman blind, a Venetian blind, a pleated blind, an electric curtain all having the battery 20, 50, the battery 20, 50 being charged by an output 14 of an external power supply 10, the charging adapter 30, 40 comprising a first plug converter 30 and a second plug converter 40, the first plug converter 30 having a first plug 34 and a second plug 36, the first plug converter 30 connectable to the second plug converter 40, the second plug converter 40 comprising a flexible cord 42 having a third plug 44 at one end of the flexible cord 42, and a fourth plug 46 at the other end of the flexible cord 42, the fourth plug 46 magnetically connectible with the second plug 36.

10 Claims, 6 Drawing Sheets

(51) Int. Cl.
*H01R 13/62* (2006.01)
*E06B 9/262* (2006.01)

(58) Field of Classification Search
USPC .................................. 320/107, 111; 439/39
See application file for complete search history.

(56) References Cited

U.S. PATENT DOCUMENTS

| | | | | |
|---|---|---|---|---|
| 2011/0143556 | A1* | 6/2011 | Hsu ......................... | H01F 38/14 |
| | | | | 439/39 |
| 2011/0159705 | A1 | 6/2011 | Schmidt | |
| 2014/0349497 | A1* | 11/2014 | Brown .................... | H01R 25/14 |
| | | | | 439/110 |
| 2015/0091388 | A1* | 4/2015 | Golko ................. | H01R 13/6205 |
| | | | | 307/104 |
| 2015/0093922 | A1* | 4/2015 | Bosscher ................ | H02J 50/10 |
| | | | | 439/39 |
| 2017/0365952 | A1* | 12/2017 | He .......................... | H01R 27/02 |
| 2018/0298682 | A1* | 10/2018 | Huang .................... | E06B 9/262 |
| 2018/0323628 | A1* | 11/2018 | Hall ........................ | E06B 9/262 |

FOREIGN PATENT DOCUMENTS

| | | |
|---|---|---|
| CN | 204764900 | 11/2015 |
| CN | 106471204 | 3/2017 |
| CN | 107923220 | 4/2018 |
| CN | 108729836 | 11/2018 |
| CN | 208551026 | 3/2019 |
| CN | 208655727 | 3/2019 |
| EP | 0668431 | 8/1995 |
| EP | 1443172 | 8/2004 |
| ES | 2306974 | 11/2008 |
| FR | 2904152 | 1/2008 |
| JP | 2019131997 | 8/2019 |
| JP | 2019214871 | 12/2019 |

OTHER PUBLICATIONS

International Search Report in PCT/DK2021/050089 dated May 28, 2021.
Chinese notification for Chinese patent application No. 2021800288290 dated Feb. 7, 2023.

* cited by examiner

CHARGING ADAPTER FOR CHARGING A BATTERY FOR BLINDS AND ELECTRIC CURTAINS ALL HAVING A DC BATTERY

This application is a 371 of PCT/DK2021/050089, filed on Mar. 25, 2021, published on Oct. 21, 2021 under publication number WO 2021/209100, which claims priority benefits from Danish Patent Application No. PA 2020 00438, filed on Apr. 14, 2020, the disclosure of which is incorporated herein by reference.

This invention relates to a charging adapter for charging a battery of either a solar blind, a roller blind, a roman blind, a Venetian blind, a pleated blind, or an electric curtain all having the battery. The battery is intended to be charged by an output of an external DC power supply.

From JP 2019214871 A is known an electrically driven shading device includes a non-contact rechargeable battery which can supply power to a control substrate for controlling the opening/closing of a shading member. Thus, generally JP 2019214871 A discloses a charging adapter for charging a battery of a blind.

The subject matter of claim 1 differs from JP 2019214871 A in the characterizing features of claim 1.

It is typical in the art known to connect the power supply outputs' female plug to the male plug input of a battery of solar blinds, roller blinds, roman blinds, Venetian blinds, pleated blinds, electric curtains all having a DC battery, where the connection between the power supply and the battery is made by a thin power cord.

The rather thin power cord is however easily torn over, and the putting together of the rather small female plug (of the power supply) to the male plug of the battery is cumbersome and involves a high degree of placement accuracy.

Thus some disadvantages of the prior art solution exist:
The female plug and the male plug could be turned or positioned (forced) wrongly into one another.
The two plugs may be spoiled by the insertion process or there is an erroneous high withdrawing force on the power cord, especially if somebody or a part of the blinds come in the way of the power cord during operation, e.g. maintenance, cleaning of the window etc.
The female plug and the male plug are difficult to position and lock correct into one another.
The two plugs are worn, or as the worst case spoiled by many connecting attempts.
Lastly, the two plugs are susceptible to wear by many disconnections.

The need has therefore been recognized for a charging adapter which obviates the foregoing and other limitations and disadvantages of the known art. Despite the various adapters and connecting wires in the prior art, there has heretofore not been provided a suitable, attractive and efficient solution to these problems and to overcome the mentioned disadvantages.

The invention will be explained by means of the following figures in which.

Figure 1:
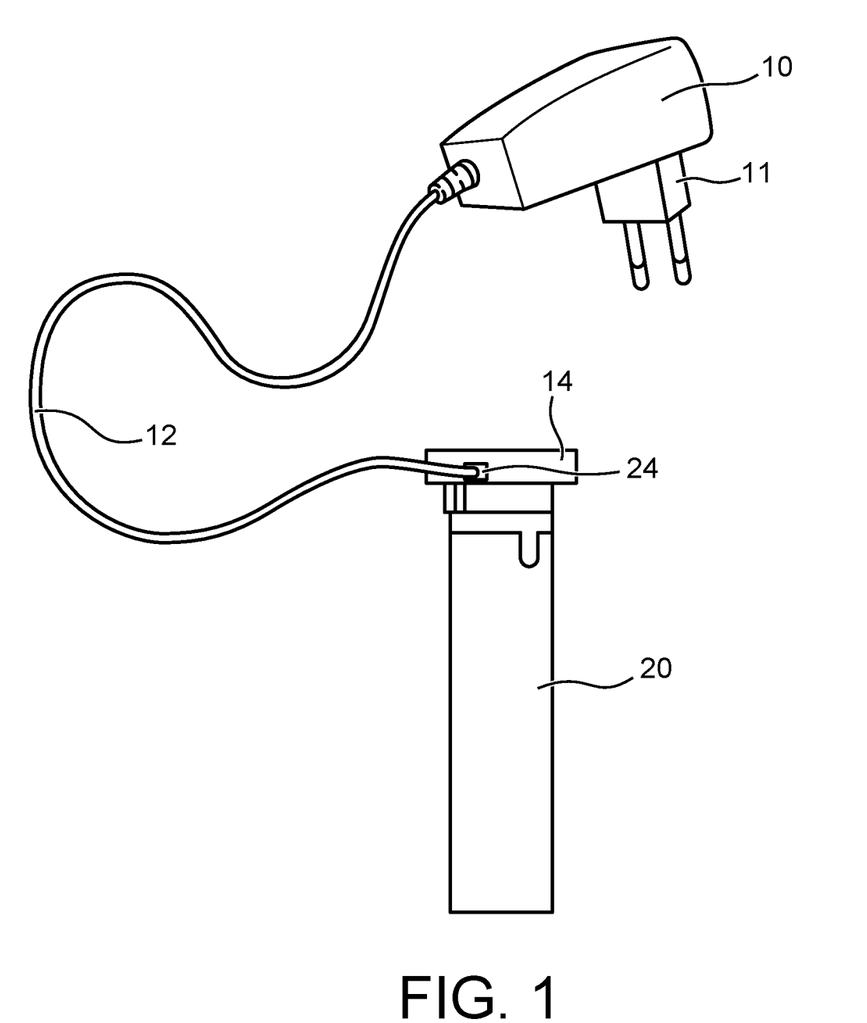
FIG. 1 is explaining the prior art.

FIG. 1 is explaining the prior art. The external power supply 10 charges the battery 20 of a solar blind, a roller blind, a roman blind, a Venetian blind, a pleated blind, an electric curtain all having the battery 20. The battery 20 is, in the prior art, charged by a 2 or 3 pin female output 14 of the external power supply 10, which female output 14 at the end of the power cord 12 is connected to the 2 or 3 pin male input 24 of the battery 20. A least two pins are required to connect the plus and minus terminals of the power supply 10. In turn the supplied DC power can turn—in a forward and a reverse direction—a DC motor to control the various positions of a blind, or a curtain to be moved up and down and stopped in a desired position. Of course the power supply 10 converts a 90-240 V 50/60 HZ AC phase zero input 11 to DC by means of well-known converter electronics.

Figure 2:
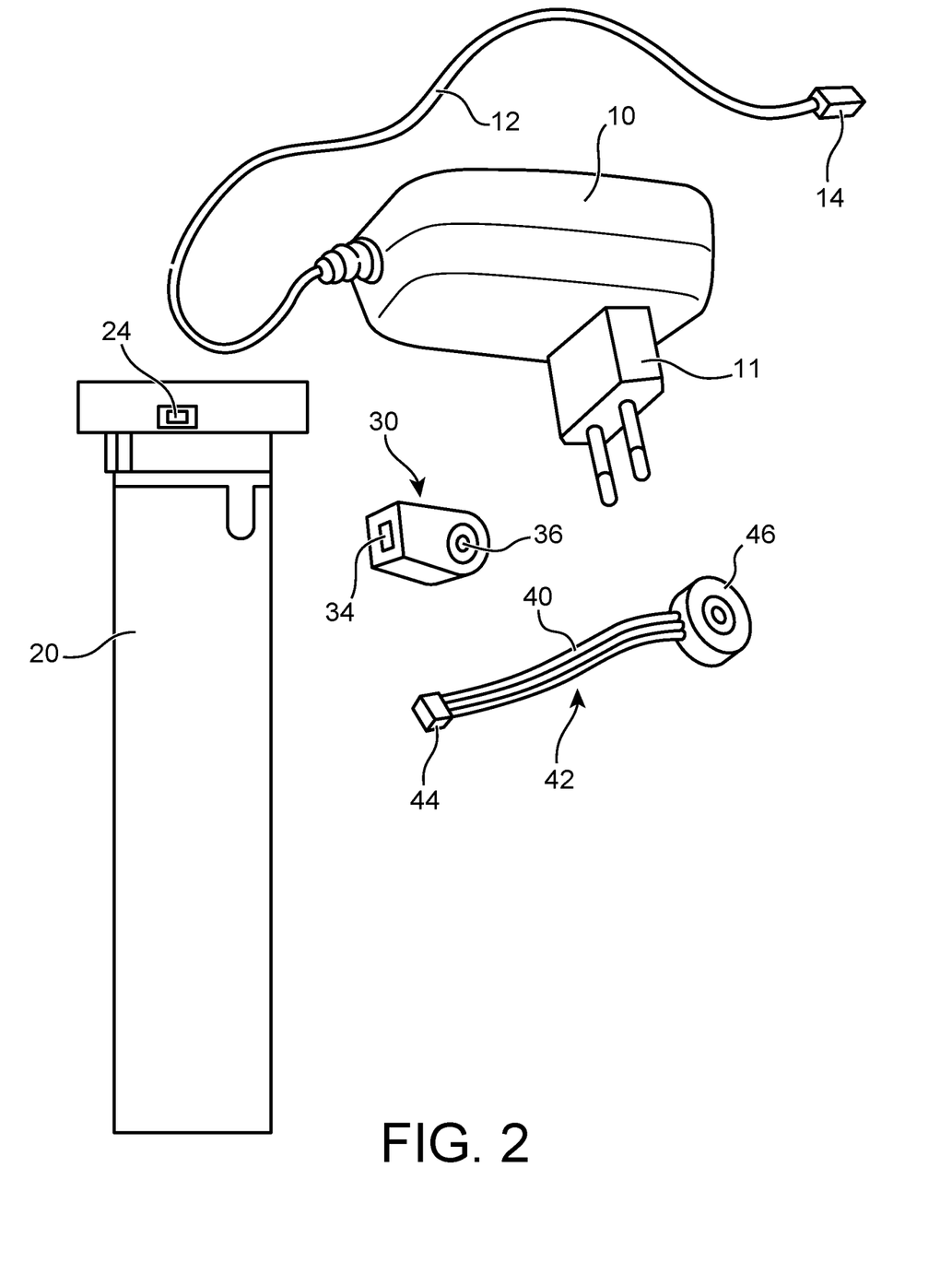
FIG. 2 is explaining an embodiment of the charging adapter invention connected to a power supply.
Figure 3:
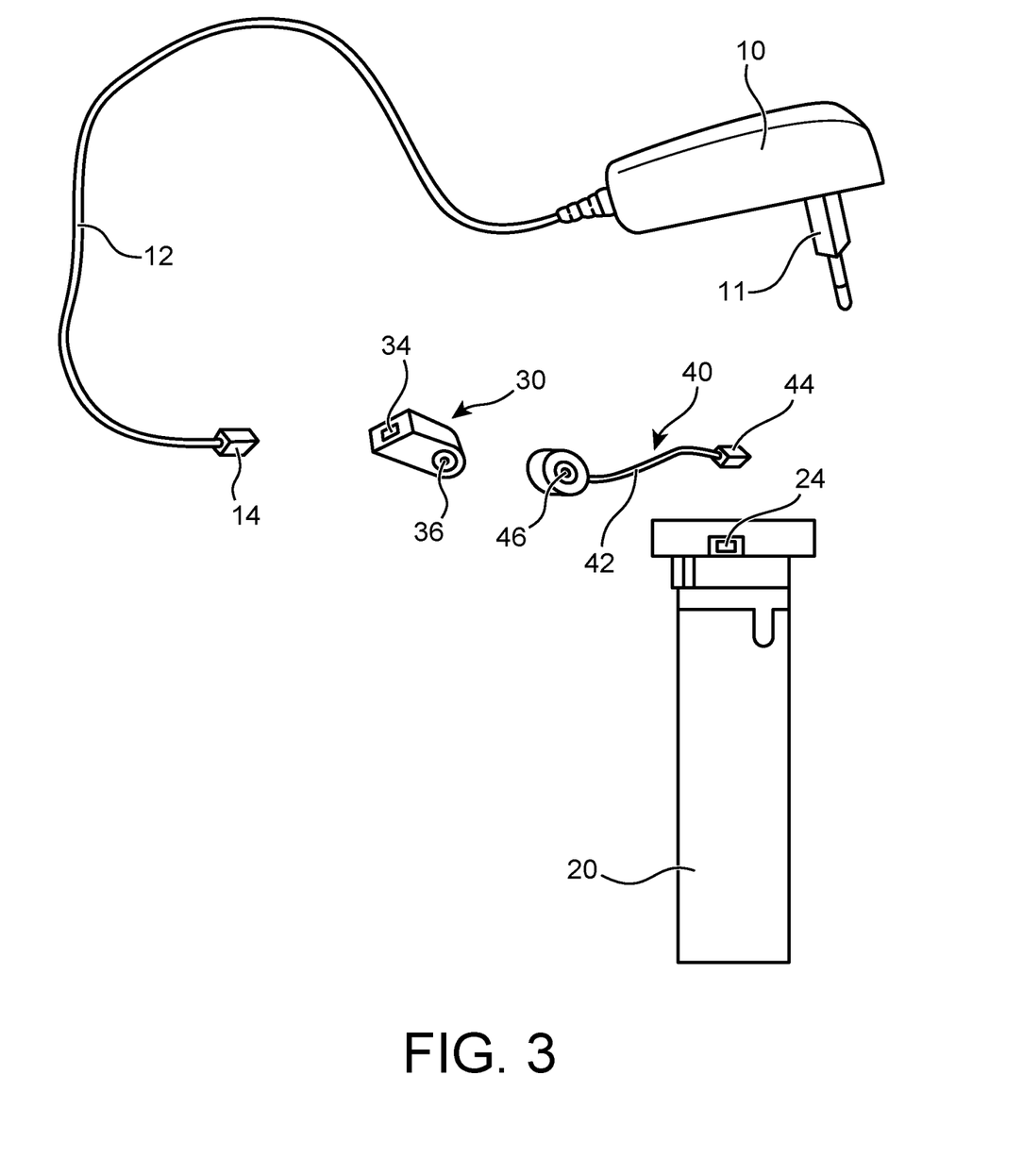
FIG. 3 shows another embodiment of the charging adapter invention connected to a power supply.

FIGS. 2 and 3 are explaining two embodiments of the inventions' charging adapter, securing that a power supply is charged. The charging adapters two parts are denoted 30 and 40. The two parts comprise two plug converters, namely a plug converter 30, which has two plugs 34 and 36, and another plug converter 40, which has a flexible power cord 42 with plugs 44 and 46 at its respective two ends. The housed plug converter 30 is intended to be electrically connected to the other plug converter 40. The housed plug converter 30 has a number of internal wires, which are applied to electrically connect the plug 34 with the plug 36.

The other plug converter 40 has a flexible power cord 42, which cord 42 has a plug 44 at the one end of the flexible cord 42, and another plug 46 at the other opposite end of the flexible power cord 42.

The left plug 46 of the flexible cord 42 of the plug converter 40 is through a magnet connected to the plug 36 belonging to the other plug converter 30. Thus when the plug 36, shown above, is in the vicinity of the below plug 46, the two plug parts 36 and 46 simply connect and align through magnetic forces, which magnetic forces hold and force the two plugs 36 and 42 to stay correctly connected together.

The rightmost female plug 44 of the flexible cord 42 of the power cord 42 plug converter 40 is to be connected to a male input 24 of the DC battery 20 to be charged.

To summarize, see FIG. 3: The female current output 14 of the external power supply 10 is connected to the plug converter 30's male plug 34 and via intern wirings to the female plug 36, the charging current enters the cord 42, when the two magnetic plugs 36 and 46 attract one another, and finally the current leaves the female plug 44, and the current then charges the battery 20, when the female plug 44 is connected into the male plug 24 belonging to the battery 20. !

Figure 4:
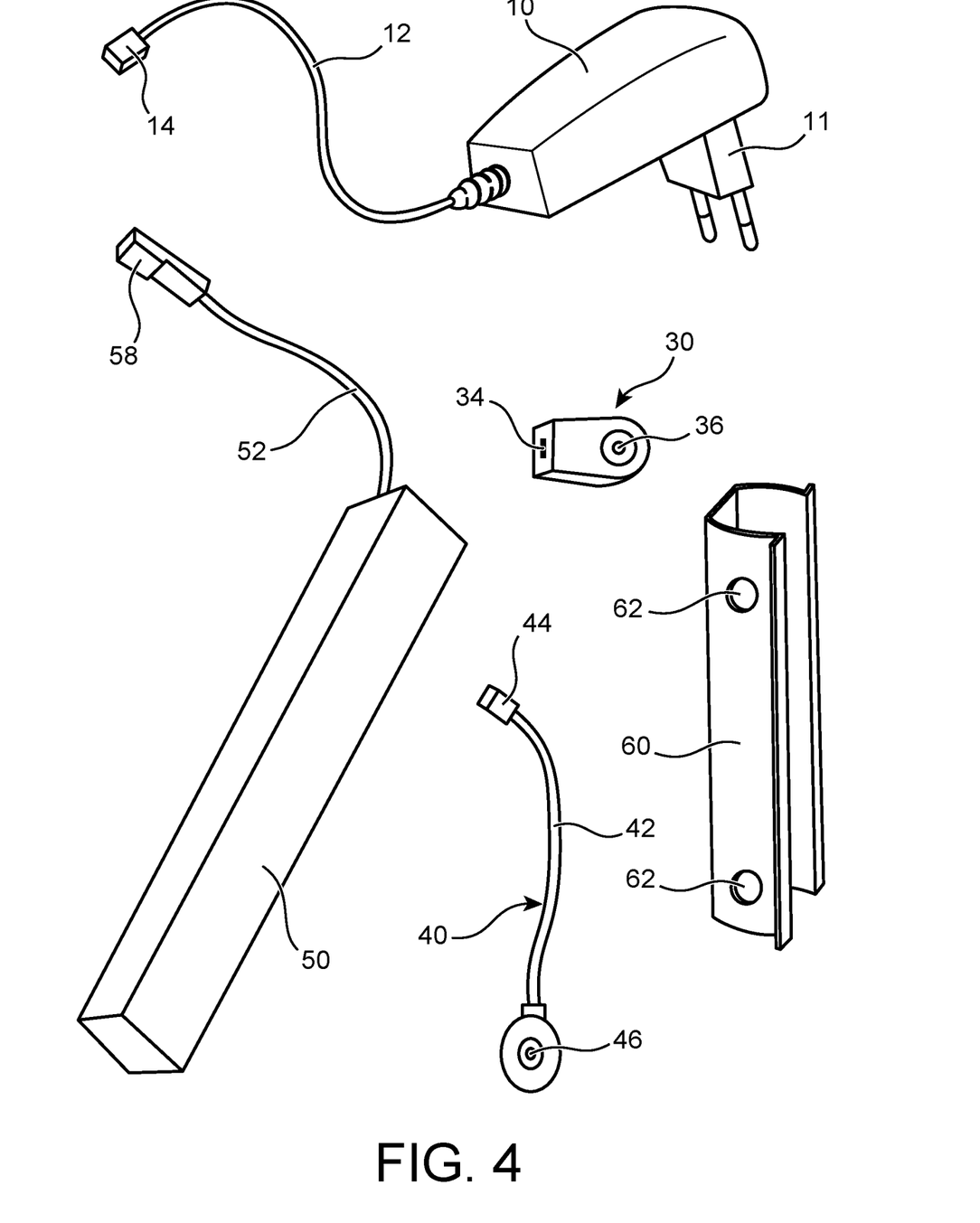
FIG. 4 shows an embodiment of the invention connected to a surface, a power supply and to a battery.
Figure 5:
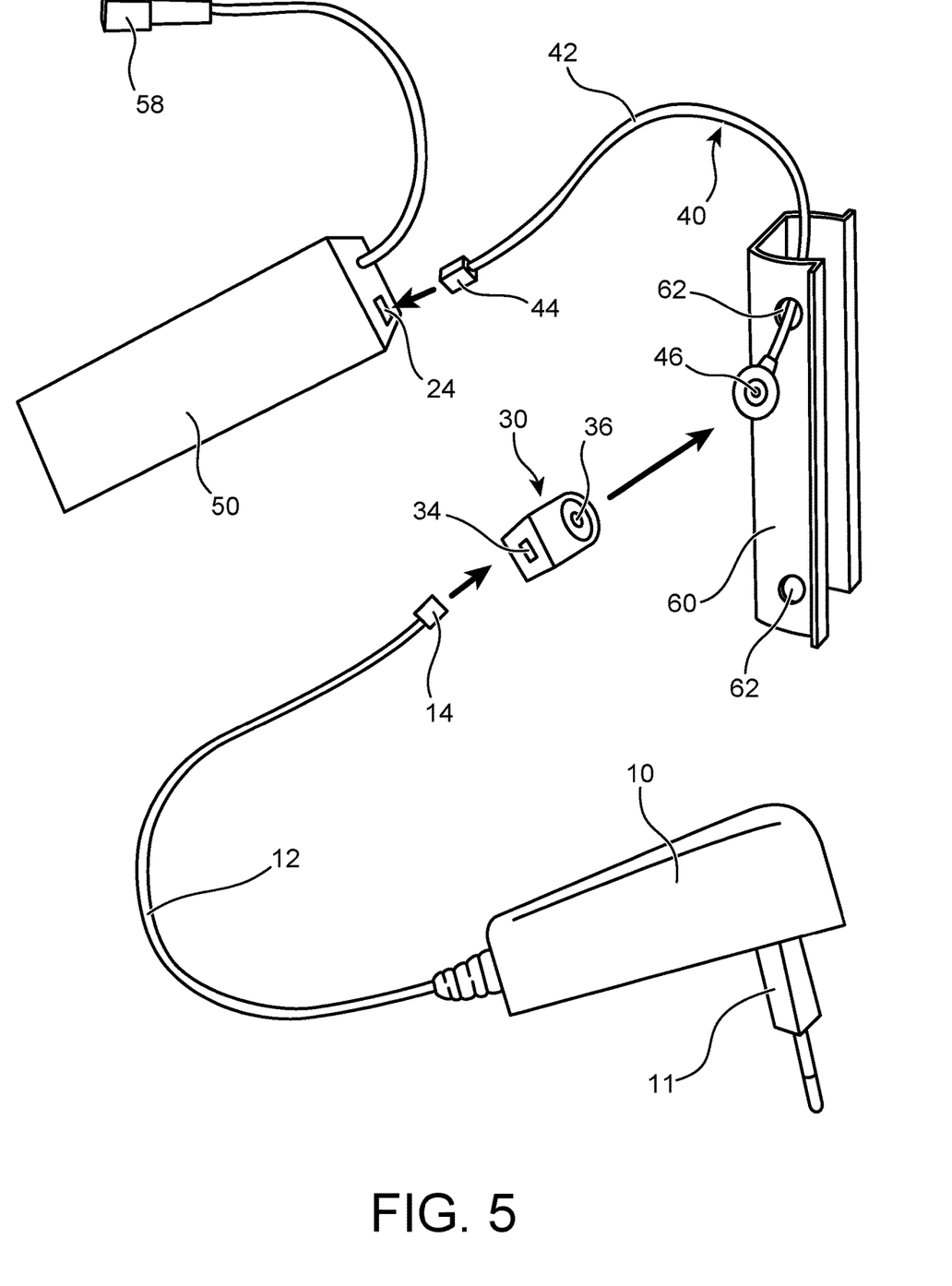
FIG. 5 shows another embodiment of the invention connected to a surface, a power supply and to a battery.

FIGS. 4 and 5 show two embodiments of the charging adapter invention connected to a surface, a power supply and to a battery. The connections of the plug converter 40 to the other plug converter 30 are as discussed by the explanation given in connection with FIGS. 2 and 3.

In order to have a fixing point for the plug 46 (in order to achieve that the plug 46 does not hang loose, does not swing on the end of the cord 42) located at the end of the cord 42, the magnetic plug 46 is intended to be placed and fixed to, and into a hole 62 (two throughgoing holes 62 as an example are shown) of a surface 60. The surface 60 is located proximate or in a longer distance to the power supply 10 and to the battery 50. The surface 60 is e.g. a part of a window frame, a wall or the like. The surface 60 could also be a profile part/side of the solar blind, the roller blind, the roman blind, the Venetian blind, the pleated blind, and/or the electric curtain, where the blinds and the curtain need be powered to be operated by a DC motor. The DC motor is voltage compatible with the power supply and the DC motor is connected to the battery 50 by means of the plug 58 powered through the battery power cord 52.

Figure 6:
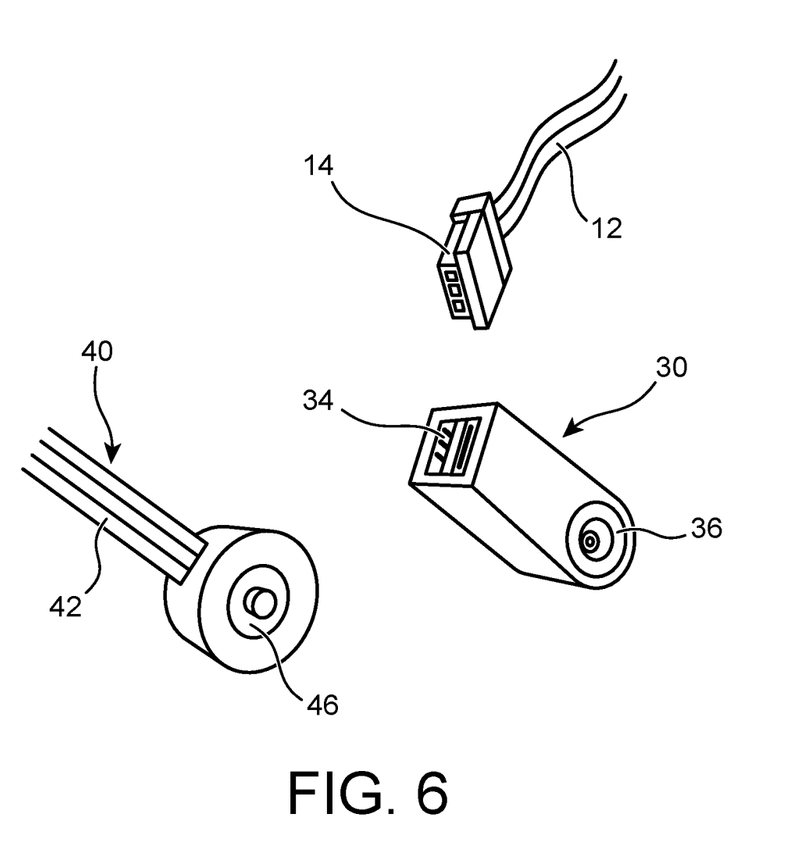
FIG. 6 shows how the invention's two main plugs are connected to one another.

FIG. 6 shows how the charging adapter invention's two main plugs are connected to one another. The plug converter 30 has two plugs 34 and 36, where the plug 36 is equipped with a permanent magnet. As discussed the plug converter 40, with the flexible power cord 42, has a magnetic plug 46 too. The two magnetic plugs 36 and 46 will simply connect and align due to attracting magnetic forces, e.g. the first case: the magnetic plug 36 is made of a north pole of a permanent magnet, and the other magnetic plug 46 comprises a south pole of another permanent magnet, or, the second case: the magnetic plug 46 is instead a north pole, whereas its counterpart, the other magnetic plug 36 comprises an opposite pole, namely a south pole of further permanent magnet. The magnetic forces between the opposite magnetic poles of the two permanent magnets 36 and 46 involved. In any of the above two cases, attracting magnetic field lines from/to the north and south pole then will ensure, when the two plugs 36, 46 are pushed together, to force the two plugs 36 and 46 to retain correctly and be stable electrically connected together. Hereby an electrical current from the DC power supply 10—by means of and through the charging adapters' two connected parts 30 and 40—is transferred to the battery 20 (as shown in the first FIGS. 2, 3) or to the battery 50 as shown in the foregoing two FIGS. 4 and 5.

In general, in an embodiment of the charging adapters' four plugs, the four plugs 34, 36, 44, 46 and the flexible cord 42 each is provided with at least two wires/terminals for transferring two currents from/to a plus and a minus terminal of the battery 20, 50 and/or to the output 14 of the external power supply 10. Correspondingly, the four plugs 34, 36, 44, 46 each have two terminals.

Moreover, an additional wire—intended for serial data transmission or for reversing the motor—is possible in two other embodiments of the charging adapters four plugs 34, 36, 44, 46 and the flexible cord 42. Accordingly, the four plugs 34, 36, 44, 46 each have three terminals, and the flexible cord 42, and the internal wiring of the plug converter 30 also comprises three wires.

In a preferred embodiment of the invention the plugs 34 and 46 are male with a number of protruding terminal(s), and the plugs 36 and 44 are female with holes for accommodation of the number of protruding terminal(s). The male plug 34 mates with the female output plug 14 of the power supply 10. The magnetic male plug 46 connects to the magnetic female plug 36, and the female plug 44 connects to the input male plug 24 of the battery 20. This paragraph apply in cases with two, three and more terminals/wires.

From the above it is the case that the plug 46 comprises a magnetic male plug, which is connectable to the plug 36, and the plug 36 comprises a magnetic female plug.

However, in another embodiment, the male and female parts/plugs are swapped. Thus the plug 46 is a magnetic female plug, which is connectable to the plug 36, which plug 36 then is a magnetic male plug.

Thus from the above implementations of the invention, some advantages exist:

The female and the male plugs 36 and 46 secure that the plugs are positioned correctly into one another.

The two plugs 36 and 46 are not spoiled by the putting together process, and if there is an erroneous high withdrawing force on the power cords 12 and 42, the two plugs 36 and 46 will disconnect.

The two plugs 36 and 46, because of their magnetic attraction, are easy to position and to lock properly into one another.

The two plugs 36 and 46 are less worn, i.e. less susceptible to wear since their common connection point is taken care by the two magnets of the two plugs 36 and 46.

While the foregoing embodiments of the adapter are at present considered to be preferred, it is understood that numerous variations—as an example different implementations of the plugs, number of terminals, male/female sex, wires etc. are also possible for a skilled person in such specific technology Modifications may be made therein by those skilled in the art and it is intended to cover in the appended claims all such variations and modifications as fall within the true spirit and scope of the invention.

The invention claimed is:

1. A charging adapter for charging a DC battery of a blind connected with the battery, the battery being charged by an output of an external power supply, the charging adapter comprising a first plug converter and a second plug converter, the first plug converter having a first plug and a second plug, the first plug converter configured to be connected to the second plug converter, the second plug converter comprising a flexible cord having a third plug at one end of the flexible cord, and a fourth plug at another end of the flexible cord, the fourth plug of the flexible cord of the second plug converter configured to be magnetically connected to the first plug converter's second plug, the fourth plug of the flexible cord of the second plug converter configured to be fixed to a window frame, a wall or a profile part of the blind the third plug of the flexible cord of the second plug converter configured to be connected to an input of the DC battery, and the first plug converter's first plug configured to be connected to the output of the external power supply.

2. The charging adapter according to claim 1, wherein the first plug and the second plug of the plug converter are both located withing a housing of the first plug converter and the charging adapter further comprising a number of wires connecting the first plug with the second plug.

3. The charging adapter according to claim 1, wherein the first plug, the second plug, the third plug, the fourth plug and the flexible cord each comprise at least two wires for transferring two currents from and to a plus and minus terminal of the DC battery or the output of the external power supply.

4. The charging adapter according to claim 3, wherein the first plug, the second plug, the third plug, the fourth plug and the flexible cord each comprise a further wire for serial data transmission.

5. The charging adapter according to claim 3, wherein the first plug, the second plug, the third plug, the fourth plug and the flexible cord each comprise a further wire for controlling a direction of a motor.

6. The charging adapter according to claim 1, wherein the fourth plug comprises a magnetic male plug configured to be connected to the second plug, and the second plug comprises a magnetic female plug.

7. The charging adapter according to claim 1, wherein the fourth plug comprises a magnetic female plug configured to be connected to the second plug, and the second plug comprises a magnetic male plug.

8. The charging adapter of claim 1, wherein the blind is one of a solar blind, a roller blind, a roman blind, a Venetian blind, a pleated blind, or an electric curtain.

9. The charging adapter of claim 1, wherein the fourth plug is configured to be fixed to a fixing point.

10. The charging adapter of claim 9, wherein the fixing point comprises a hole in a surface and wherein the surface is a part of the window frame, the wall or the profile part of the blind.

* * * * *